United States Patent [19]
Thompson

[11] Patent Number: 5,132,013
[45] Date of Patent: Jul. 21, 1992

[54] FILTER ASSEMBLY WITH A HOLLOW PERFORATED BODY

[76] Inventor: James E. Thompson, 1050 Snively Ave., Winter Haven, Fla. 33880

[21] Appl. No.: 528,594

[22] Filed: May 24, 1990

[51] Int. Cl.⁵ ............................................ B01D 35/28
[52] U.S. Cl. ................................. 210/448; 210/452; 210/497.3; 210/499
[58] Field of Search ...................... 210/448, 452, 497.3, 210/499

[56] References Cited

U.S. PATENT DOCUMENTS

| | | | |
|---|---|---|---|
| 2,028,520 | 1/1936 | Phillips | 210/452 |
| 2,722,316 | 11/1955 | Goscila | 210/452 |
| 2,801,008 | 7/1957 | Schmid | 210/444 |
| 3,317,042 | 5/1967 | Botstiber | 210/452 |
| 3,502,220 | 3/1970 | Kohlberg | 210/452 |
| 4,946,598 | 8/1990 | Murphy et al. | 210/452 |

Primary Examiner—Robert A. Dawson
Assistant Examiner—Wanda L. Millard
Attorney, Agent, or Firm—Pettis & McDonald

[57] ABSTRACT

A self-cleaning filter assembly for removing suspended matter from fluids, primarily utilized in irrigation or similar distribution systems, resulting in reduced maintenance of the filter assembly as well as the total system. The filter assembly comprises a container having at least one inlet aperture and at least one outlet aperture therethrough and a filter screen, comprising a hollow perforated body, inserted within the container. One end of a conduit is connected in fluid flow relationship to the inlet aperture of the container while the other end of the conduit terminates within the hollow body comprising the filter screen. The outlet aperture is so located that the fluid entering the container through the fluid inlet aperture and the conduit must pass through the filter screen before exiting the container through the outlet aperture.

15 Claims, 1 Drawing Sheet

U.S. Patent
July 21, 1992
5,132,013
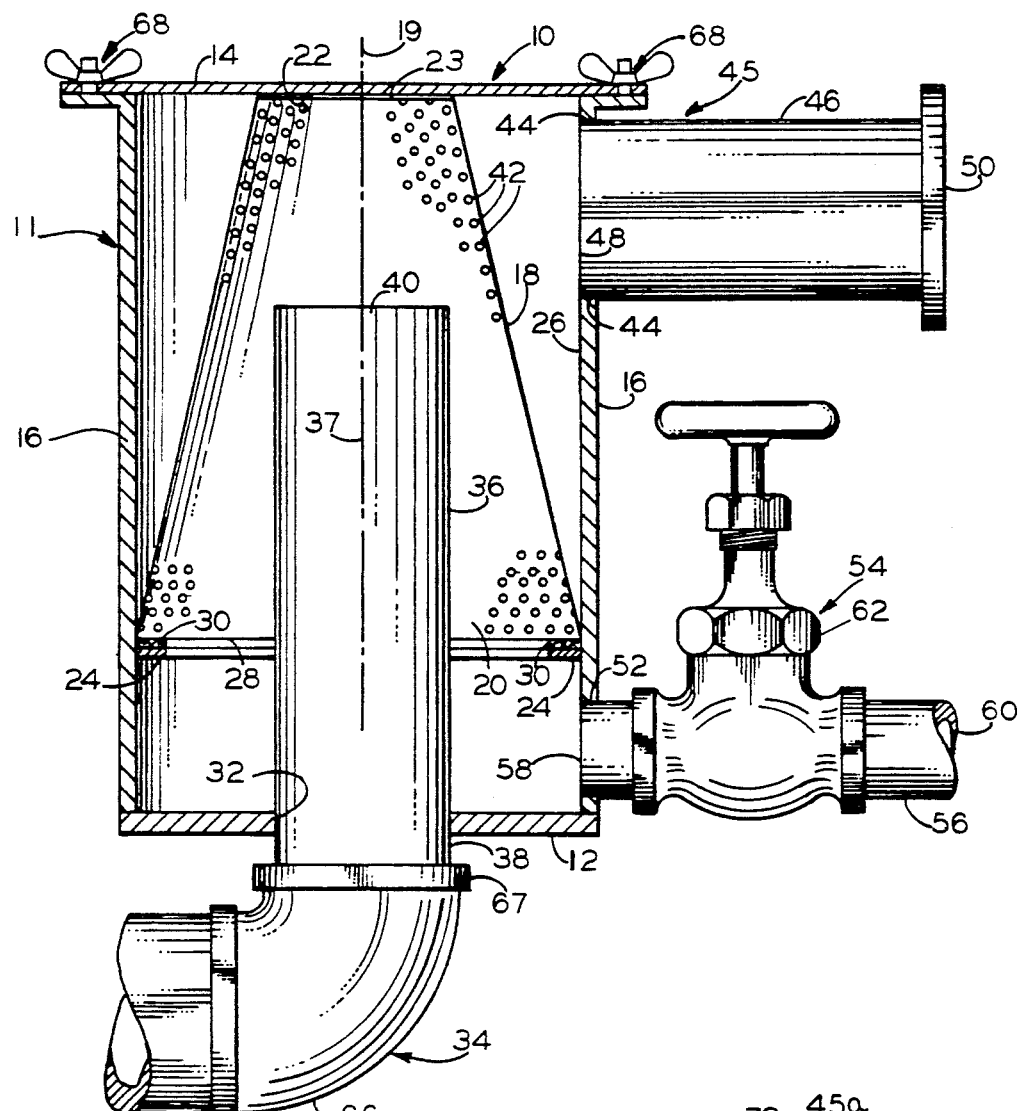
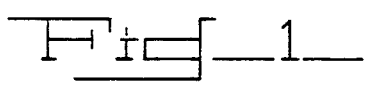
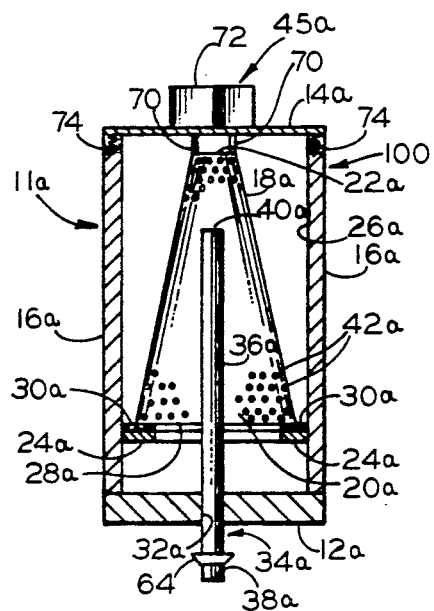

FILTER ASSEMBLY WITH A HOLLOW PERFORATED BODY

BACKGROUND OF THE INVENTION

1. Field of the Invention

The present invention relates to a self-cleaning filter assembly for removing suspended matter from fluids, the assembly being utilized primarily in irrigation or similar distribution systems.

2. Description of the Prior Art

It is certainly well known that fluids to be distributed by irrigation systems frequently contain suspended matter that should be removed before attempting to pass the fluid through sprinkler heads and other system apertures. The particles and other debris, if not removed by filtering, will clog any apertures which are smaller than the suspended matter.

Current filter systems are comprised of a distribution box having a bottom, four sides and a top in which a flat filter screen is mounted parallel to the bottom of the box. A fluid supply pipe enters at the bottom of the box; the end of the supply pipe is connected flush with the bottom of the box. Distribution lines are connected to the box at a point between the screen and the box top. The fluid flow is thus directed to strike the filter screen at right angles. The force of the water flow causes the suspended matter to be projected against the filter screen, frequently causing the matter to be forced into the screen apertures, resulting in blockages of those apertures. These blockages cause reduced flow and eventually system shut down.

When the fluid supply to the distribution box is cut off, the fluid within the box retreats into the supply line drawing the collected matter plus air into the pipe. When fluid is again pumped into the distribution box, a column of air, the filtered matter and water is ejected from the supply pipe in an explosive manner striking the filter screen with such force that the matter may be lodged within the apertures or even forced through them, further contributing to the clogging of the filter screen and other apertures in the distribution system.

It is clear that there is a need for a self-cleaning filter assembly. A self-cleaning filter will increase the length of use between cleanings, reducing down time and maintenance costs and it will reduce the risk of damage to downstream equipment. This will result in a more efficient and cost effective distribution system.

SUMMARY OF THE INVENTION

The present invention relates to a self-cleaning filter for irrigation systems and other fluid supply systems. In a self-cleaning system the filtered matter is neither continuously projected against the filter screen nor sucked into the supply pipe upon the shut down of the pumps. Most simply stated, the filter assembly of this invention comprises a container, a filter screen, an inlet aperture, a fluid supply means, a conduit, at least one outlet aperture, and at least one distribution means. The container is designed to maintain the integrity of the pressurized system; the container comprises a base, a lid and at least one wall therebetween. Located within the container is a filter screen comprising a hollow perforated body, the body having an open end and a closed end and the open end having a peripheral edge. The filter screen is inserted within the container such that the open end of the filter screen is proximal to the base of the container and the closed end of the filter screen is proximal to the lid of the container.

The conduit has a first and a second end, its first end connected in a fluid flow relationship to the inlet aperture of the container. The conduit extends through the open end of the filter screen, such that the second end of the conduit is located intermediate the open end of the filter screen and the closed end of the filter screen. The fluid supply means is connected in fluid flow relationship with the inlet aperture and with the first end of the conduit.

The second end of the conduit and the outlet aperture are so located in relation to the filter screen that all fluid entering through the conduit must pass through the filter screen prior to exiting the container through the outlet aperture. At least one fluid distribution means is connected in fluid flow relationship with at least one outlet aperture.

The filter means, being a hollow perforated body, comprises curved surfaces over which the unfiltered fluid that has been reflected by the filter screen may swirl downwardly cleansing the perforations and forcing the filtered matter downward to the bottom of the container, where it may be collected in an area outside the direct flow of the fluid. The second end of the conduit, by being inserted into the filter body cavity, helps create the downward flow by directing the fluid against the top of the filter screen, causing the fluid that does not pass through the screen to be reflected downward. Another benefit gained by the supply means projecting upward from the base of the container is that the material collected in the bottom of the container will not be sucked into the supply means when the fluid flow has been shut off. The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a cross section of a side elevation of the preferred embodiment of the filter assembly.

FIG. 2 is a cross section of a side elevation of a second embodiment of the filter assembly.

Similar reference characters refer to similar parts throughout the several views of the drawings.

DETAILED DESCRIPTION

A preferred embodiment for the filter assembly of this invention is illustrated in FIG. 1 of the drawings. The filter assembly is generally indicated as 10. In FIG. 1, it can be seen that the filter assembly 10 comprises a container, shown generally as 11, which comprises a base 12, a removable lid 14 and a cylindrical wall 16 therebetween. While the preferred embodiment discloses a single wall 16, the container 11 may be constructed of any number of walls with good results.

A filter screen 18 comprising a hollow perforated body is placed within the container 11; in the preferred embodiment the filter screen 18 is a frustum of a cone, but other similar shapes will work satisfactorily. The filter screen has an open end 20 and a closed end 22. The closed end 22 may be closed by a separate cap 23 across the end or by being sealed against the lid 14. Also, the screen may be directly attached to the lid 14 so that when the lid 14 is removed from the container 11, the filter screen 18 is removed with it.

At a point intermediate the base 12 and the lid 14 a holding means, flange 24, is attached to the interior surface 26 of the wall 16 of the container 11. The flange 24 extends continuously around the circumference of the wall 16 to provide a surface upon which the peripheral edge 28 of the open end 20 of the filter screen 18 may rest. In the preferred embodiment this flange 24 is located approximately one-fourth of the distance from the base 12 to the lid 14, the flange being proximal to the base 12. This proportion may be varied based on the fluid pressure within the container 11, the size of the perforations 42 through the filter screen 18 and the total size of the filter system. The proportions shown in FIG. 1 are approximately those for a container having a wall height of between 2½ to 3 feet, a diameter of 2-3 feet and a typical fluid flow of 2,000 gallons per minute.

To provide a tight seal between the peripheral edge 28 of the open end 20 of the filter screen 18 and the flange 24, a gasket 30, comprised of any suitable material, may be placed therebetween. The gasket 30 will prevent fluid containing suspended solids from bypassing the filter screen 18.

The container 11 has an inlet aperture 32 through the base 12, to which the first end 38 of a conduit 36 has been connected in a fluid flow relationship. The second end 40 of the conduit 36 remains free, and when the conduit 36 is inserted within the open end 20 of the filter screen 28 the second end 40 of the conduit is located intermediate the open end 20 and the closed end 22 of the filter screen. In the preferred embodiment the second end 40 of the conduit 36 is located three-quarters of the distance from the base 12 to the lid 14; however, this distance may be varied according to the size of the conduit 36, the fluid pressure within the container 11 and the size of the perforations 42 in the filter screen 18. The size of the perforations 42 will be determined by the size of the material which must be removed and the size of the apertures in the sprinkler heads (not shown) or other distribution means that must be protected.

A fluid supply means, shown generally as 34, comprises a supply pipe 66 and a fluid source (not shown). One end 67 of supply pipe 66 is connected in fluid flow relationship to the inlet aperture 32 and the first end 38 of the conduit 36.

The hollow perforated body of the filter screen 18 has an axis 19 passing through the center of symmetry of its open end 20 and the center of symmetry of its closed end 22. The conduit 36 has a longitudinal axis 37; and, in the preferred embodiment, the portion of the axis 37 adjacent the second end 40 of the conduit 36 is generally coincident with the axis 19 of filter 18. However, the filter system would operate effectively even if the axes 19 and 37 were far from coincidental.

In the preferred embodiment, the outlet aperture 44 of the container 11 passes through the wall 16 proximal to the lid 14. The fluid distribution means generally indicated as 45 comprises an outlet pipe 46, having a first end 48 and a second end 50 and a distribution system (not shown). The first end 48 of the outlet pipe 46 is connected in a fluid flow relationship with the outlet aperture 44 such that fluids entering the container 11 may exit the container 11 through the outlet aperture 44 and the first end of pipe 48. The second end 50 of the outlet pipe 46 is connected to a distribution system (not shown).

A flushing aperture 52 passes through the wall 16 of the container 11 proximal to the base 12. A flushing means, shown generally as 54 in FIG. 1, comprises a flushing pipe 56 having a first end 58 and a second end 60 with a valve 62 interposed therebetween. The first end 58 of the flushing pipe 56 is connected to the flushing aperture 52 in a fluid flow relationship. The second end 60 of pipe 56 is connected to a disposal means (not shown). The valve 62 is shown in the preferred embodiment to be a manual valve; however, the valve may be automated, which would permit a flushing operation to be conducted without the presence of an operator.

FIG. 2 illustrates a second embodiment of the filter assembly, shown generally as 100, which has the same basic structure as the preferred embodiment; the same reference characters are used for the same structure with the addition of the letter "a" in this embodiment. The differences in the second embodiment include: (1) the fluid distribution means, shown generally as 45a is mounted on the lid 14a and comprises a sprinkler head 72, (2) the first end 38a of the conduit 36a of the fluid supply means 34a has a distribution line connector 64 attached that permits filter assembly 100 to be attached directly to a distribution line (not shown), and (3) the closed end 22a of the filter screen 18a is spaced apart from the lid 14a to prevent obstruction of the inlet aperture (not shown) of the sprinkler head 72, located in the lid 14a. Spacers 70 attached to the filter screen 18a and pressing against the lid 14a hold the filter screen 18a in place against the gasket 30a to maintain the spaced apart relationship with the lid 14a. The filter assembly 100, FIG. 2, is much smaller in size than the preferred embodiment of the filter assembly 10, shown in FIG. 1. For the filter assembly, shown generally as 100, the flange 24a is located approximately one-fourth of the distance from the base 12a to the lid 14a, the flange being proximal to the base 12a. The second end 40a of conduit 36a is located approximately threefourths the distance from the base 12a to the lid 14a, with the second end 40a of the conduit 36a being proximal to the lid 14a. These proportions may vary according to the conditions for their use, e.g. fluid pressure within the distribution means. A series of these filter assemblies 100 are frequently attached by the distribution line connector 64 to a distribution line (not shown); whereas, the filter assembly 10 is configured to handle the flow of a large distribution line or distribution system.

The filter assemblies 10 and 100 are constructed primarily of plastic but any suitable material or combination of materials may be used.

Having thus set forth a preferred construction for the filter assembly 10 of this invention, it is to be remembered that this is but a preferred embodiment. Attention is now invited to a description of the use of the filter assembly 10 and filter assembly 100. The filter assembly 10 is used to filter out suspended matter carried by a fluid that is to be dispensed through a distribution system that may have sprinkler heads or jets with small holes easily clogged by suspended material. While the fluid usually used in irrigation systems is water, the filter system may be used with any fluid carrying suspended matter. The fluid supply means 34, provides the fluid, under pressure and having suspended matter therein, from a conventional source (not shown) through the supply pipe 66 to the conduit 36. The fluid, being under pressure, is forced upward into container 11 striking the closed end 22 of the filter screen 18 and is then directed downward against the sides of the filter screen 18. At this time some of the fluid may pass through the perforations 42 of the filter screen 18, but the suspended matter that is larger than the perforations 42 will be carried downward by the fluid flow to be collected at the bottom of the container 11, below the filter screen 18. The force of the fluid washing downward along the filter screen 18 will help prevent clogging of the perforations 42 of the filter screen 18. The clean fluid having passed through the filter screen 18 and still being under pressure will exit the container 11 via the fluid distribution means 45 by passing through the first end 48 of the outlet pipe 46 which is in fluid flow connection with outlet aperture 44 in the container 11.

The matter collected by the filter screen 18 builds up within the container 11, of the preferred embodiment 10, and must be removed by flushing. To flush container 11 properly, the fluid outlet means 45 must be closed, by closing a valve downstream (not shown) or by other means. Then valve 62 of the flushing means 54, may be opened so that the filtered matter is flushed out of the container 11 by the fluid entering through the conduit 36 and exiting through the flushing means 54.

It will also be necessary to clean the filter screen 18 to remove embedded matter clogging the perforations 42. In the preferred embodiment the lid 14 is attached to the container 11 by wing nuts and bolts shown generally as 68. Any other removable attaching system well known in the art may be used. When the lid 4 is removed, the filter screen 18 becomes accessible for removal from the container 11 for cleaning.

The second embodiment 100 of the filter assembly as shown in FIG. 2, is attached directly to a distribution line (not shown) by the distribution line connector 64. A jet sprinkler head 72, acting as the distribution means 45a, may then be mounted to the outlet aperture (not shown). Fluid is allowed to enter the supply pipe and thus into the conduit 36a and container 11. The fluid will then flow in a similar manner as it did in the first embodiment shown in FIG. 1, through the filter screen 40 and out the fluid distribution means 45a, and thus through the attached jet sprinkler head 72.

To gain access to the filter screen 18 for cleaning purposes the lid 14 has been threadably joined to the walls 16 of the container 11, as indicated at 74, for easy removal.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

I claim:

1. A filter assembly for removing suspended matter from a fluid, said assembly comprising:
    a container, said container having a base, a lid and at least one wall therebetween, said container having an interior surface and an exterior surface, and said container having an inlet aperture and an outlet aperture;
    a filter screen comprising a hollow perforated body, said body having an open end and a closed end, and said open end having a peripheral edge, and said body having an axis passing through the center of symmetry of said open end and the center of symmetry of said closed end, said filter screen being inserted within said container such that said open end of said filter screen is proximal to said base and said closed end of said filter screen is proximal to said lid;
    a conduit having a first open end and a second open end, said first end being connected in fluid flow relationship to a said inlet aperture of said container, said conduit extending through said open end of said filter screen such that said second end of said conduit is spaced apart from said closed end of said filter screen; and
    said outlet aperture so located that the fluid may exit said container through said outlet only after having first passed through said filter screen.

2. A filter assembly as in claim 1 wherein said filter assembly further comprises a holding means attached to said interior surface of said container, said filter screen being connected to said holding means such that said filter screen is retained in a predetermined spatial relationship with said container.

3. A filter assembly as in claim 2 wherein said holding means comprises a flange connected to said interior surface of said wall intermediate said lid and said base of said container such that said peripheral edge of said open end of said filter screen may be connected to said flange.

4. A filter assembly as in claim 3 further comprising a sealing means interposed between said peripheral edge and said flange.

5. A filter assembly as in claim 1 further comprising a fluid supply means connected in fluid flow relationship with said inlet aperture in said container.

6. A filter assembly as in claim 1 wherein said filter assembly further comprises a fluid distribution means connected in fluid flow relationship with said outlet aperture of said container such that the fluid may exit said container into said distribution means.

7. A filter assembly as in claim 1, wherein said open end of said filter screen has a larger perimeter than said closed end.

8. A filter assembly as in claim 1, wherein said container further comprises a flushing aperture through said container; said filter assembly further comprising flushing means, said flushing means connected in fluid flow relationship with said flushing aperture whereby the matter may be removed from said container.

9. A filter assembly as in claim 1 wherein said outlet aperture passes through said lid.

10. A filter assembly as in claim 1 wherein a sprinkler head is connected to said outlet aperture.

11. A filter assembly as in claim 1, wherein said filter screen is removably inserted within said container.

12. A filter assembly as in claim 1 wherein said conduit further comprises a longitudinal axis, said longitudinal axis of said conduit, adjacent said second end of said conduit, being generally aligned with said axis of said hollow perforated body.

13. A filter assembly as in claim 1 wherein said outlet aperture passes through said wall proximal to said lid.

14. A filter assembly for removing suspended matter from a fluid, said assembly comprising:

a container, said container having a base, a lid and at least one wall therebetween, said container having an interior surface and an exterior surface, and said container having an inlet aperture passing through said base, an outlet aperture passing through said wall proximal to said lid and a flushing aperture passing through said wall proximal to said base;

a filter screen comprising a hollow perforated body having an open end with a peripheral edge, and a closed end, said open end having a larger perimeter than said closed end, and said filter screen being inserted within said container such that said open end of said filter screen is proximal to said base and said closed end of said filter screen is proximal to said lid;

a flange attached to said interior surface of said wall intermediate said lid and said base of said container, said peripheral edge of said open end of said filter screen being connected to said flange so that said filter screen is retained in a predetermined spatial relationship with said container;

a conduit having a first open end and a second open end, said first end of said conduit being connected in fluid flow relationship with said inlet aperture of said container, said conduit extending through said open end of said filter screen such that said second end of said conduit is located intermediate said open end of said filter screen and said closed end of said filter screen;

a fluid distribution means connected in fluid flow relationship with said outlet aperture so that the fluid may exit said container through said outlet aperture and enter said distribution means, said outlet aperture so located that the fluid must pass through said filter screen before exiting said container; and a flushing means connected in fluid flow relationship with said flushing aperture such that the filtered matter filtered from the fluid by said filter screen may be removed from said container.

15. A filter assembly for removing suspended matter from a fluid, said assembly comprising:

a container, said container having a base, a lid and at least one wall therebetween, said container having an interior surface and an exterior surface, and said container having an inlet aperture and an outlet aperture;

a filter screen comprising a hollow perforated body, said body having an open end and a closed end, and said open end having a peripheral edge, and said filter screen being inserted within said container such that said open end of said filter screen is proximal to said base and said closed end of said filter screen is attached to said lid;

a conduit having a first open end and a second open end, said first end being connected in fluid flow relationship to a said inlet aperture of said container, said conduit extending through said open end of said filter screen such that said second end of said conduit is located intermediate said open end of said filter screen and said closed end of said filter screen; and said outlet aperture so located that the fluid may exit said container through said outlet only after having first passed through said filter screen.

* * * * *